United States Patent
Jin et al.

(10) Patent No.: US 8,908,305 B1
(45) Date of Patent: Dec. 9, 2014

(54) SYSTEMS AND METHODS FOR SLIDER HEAD STABILITY DETERMINATION

(71) Applicant: LSI Corporation, San Jose, CA (US)

(72) Inventors: Ming Jin, Fremont, CA (US); Haitao Xia, San Jose, CA (US); Wu Chang, Santa Clara, CA (US)

(73) Assignee: LSI Corporation, San Jose, CA (US)

( * ) Notice: Subject to any disclaimer, the term of this patent is extended or adjusted under 35 U.S.C. 154(b) by 0 days.

(21) Appl. No.: 14/446,215

(22) Filed: Jul. 29, 2014

(51) Int. Cl.
*G11B 27/36* (2006.01)
*G11B 21/02* (2006.01)

(52) U.S. Cl.
USPC .............................................. 360/31; 360/75

(58) Field of Classification Search
USPC ........... 360/31, 75, 119.03, 125.3, 25, 46, 51, 360/55, 66, 65, 68, 48
See application file for complete search history.

(56) References Cited

U.S. PATENT DOCUMENTS

| | | | |
|---|---|---|---|
| 5,862,007 A | 1/1999 | Pham | |
| 6,141,167 A | 10/2000 | Nishida | |
| 6,301,068 B1 | 10/2001 | Ionescu | |
| 6,657,809 B2 | 12/2003 | Ottesen | |
| 6,658,054 B1 | 12/2003 | Kuribayashi | |
| 6,696,832 B2 | 2/2004 | Chew | |
| 6,798,832 B1 | 9/2004 | Nakata | |
| 6,826,003 B1 | 11/2004 | Sybrahmanyam | |
| 7,154,827 B2 | 12/2006 | Tokita | |
| 7,423,827 B2 | 9/2008 | Neville | |
| 7,680,217 B2 | 3/2010 | Wilson | |
| 7,800,999 B2 | 9/2010 | Muramatsu | |
| 7,821,730 B2 | 10/2010 | Cao | |
| 7,869,158 B1 | 1/2011 | Cheung | |
| 7,880,988 B2 | 2/2011 | Ahn | |
| 7,929,240 B2 | 4/2011 | Mathew | |
| 8,032,798 B2 * | 10/2011 | Ferren et al. ..................... 714/54 |
| 8,467,142 B2 | 6/2013 | Sakai et al. | |
| 2005/0094301 A1 | 5/2005 | Berman | |
| 2005/0146803 A1 | 7/2005 | Kim et al. | |
| 2005/0219729 A1 | 10/2005 | Franck | |
| 2006/0082915 A1 | 4/2006 | Eleftheriou | |
| 2006/0087757 A1 | 4/2006 | Flynn | |
| 2007/0076313 A1 | 4/2007 | Hutchins | |
| 2008/0266693 A1 | 10/2008 | Bliss | |
| 2009/0190247 A1 | 7/2009 | Yanagisawa | |
| 2010/0135142 A1 | 6/2010 | Honma | |
| 2011/0242691 A1 | 10/2011 | Burger | |
| 2013/0198421 A1 | 8/2013 | Aravind | |

FOREIGN PATENT DOCUMENTS

WO   WO 9535565 A1   12/1995

OTHER PUBLICATIONS

Scholz et al., "Micromagnetic Modeling of Head Field Rise Time for High Data-Rate Recording", IEEE Transactions on Magnetics, vol. 41, Issue 2, pp. 702-706 (Feb. 2005).

Taratorin et al., "Media saturation and overwrite in perpendicular recording", IEEE Transactions on Magnetics, vol. 42, Issue 2, pp. 157 Œ 162 (2006).

U.S. Appl. No. 13/524,462, Unpublished (filed Jun. 15, 2012) (Nayak Ratnakar Aravind).

U.S. Appl. No. 13/545,348, Unpublished (filed Jul. 10, 2012) (Ming Jin).

(Continued)

*Primary Examiner* — Nabil Hindi
(74) *Attorney, Agent, or Firm* — Hamilton DeSanctis & Cha

(57) ABSTRACT

Systems and method relating generally to data processing, and more particularly to systems and methods for determining head stability.

20 Claims, 8 Drawing Sheets

(56) References Cited

OTHER PUBLICATIONS

U.S. Appl. No. 13/362,466, Unpublished (filed Jan. 31, 2012) (Nayak Ratnakar Aravind).
U.S. Appl. No. 13/113,210, Unpublished (filed May 23, 2011) (Xun Zhang).
U.S. Appl. No. 13/100,063, Unpublished (filed May 3, 2011) (Ming Jin).
U.S. Appl. No. 13/096,900, Unpublished (filed Apr. 28, 2011) (Ross S. Wilson).
U.S. Appl. No. 13/472,448, Unpublished (filed May 15, 2012) (Ross S. Wilson).
U.S. Appl. No. 13/302,169, Unpublished (filed Nov. 22, 2011) (Boris Livshitz).

* cited by examiner

SYSTEMS AND METHODS FOR SLIDER HEAD STABILITY DETERMINATION

FIELD OF THE INVENTION

The present inventions are related to systems and methods for data storage, and more particularly to systems and methods for determining head stability in a storage system.

BACKGROUND

Various data storage systems have been developed that include a slider or head disposed in relation to a storage medium. As the slider traverses a region above the storage medium it is exposed to both electrostatic forces and inter-molecular sources. These forces, inter alia, operate to destabilize the aerodynamic motion of slider. This instability results in a pitch and/or roll of the slider relative to the storage medium. In some cases, this instability results in pitch and/or roll of the slider while a dynamic fly height control indicates that the fly height is substantially constant. This instability makes information transfer to/from the storage medium problematic.

Hence, for at least the aforementioned reasons, there exists a need in the art for advanced systems and methods for determining slider instability.

SUMMARY

The present inventions are related to systems and methods for data storage, and more particularly to systems and methods for determining head stability in a storage system.

Various embodiments of the present invention provide slider stability determination circuits that include: a first signal to noise estimation circuit operable to calculate a first signal to noise ratio associated with a first read sensor; a second signal to noise estimation circuit operable to calculate a second signal to noise ratio associated with a second read sensor; a summation circuit operable to subtract the first signal to noise ratio from the second signal to noise ratio to yield a delta signal to noise ratio; and a stability determination circuit operable to determine a slider stability based at least in part on the delta signal to noise ratio.

This summary provides only a general outline of some embodiments of the invention. The phrases "in one embodiment," "according to one embodiment," "in various embodiments", "in one or more embodiments", "in particular embodiments" and the like generally mean the particular feature, structure, or characteristic following the phrase is included in at least one embodiment of the present invention, and may be included in more than one embodiment of the present invention. Importantly, such phases do not necessarily refer to the same embodiment. Many other embodiments of the invention will become more fully apparent from the following detailed description, the appended claims and the accompanying drawings.

BRIEF DESCRIPTION OF THE FIGURES

A further understanding of the various embodiments of the present invention may be realized by reference to the figures which are described in remaining portions of the specification. In the figures, like reference numerals are used throughout several figures to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

DETAILED DESCRIPTION OF SOME EMBODIMENTS

Figure 1A:
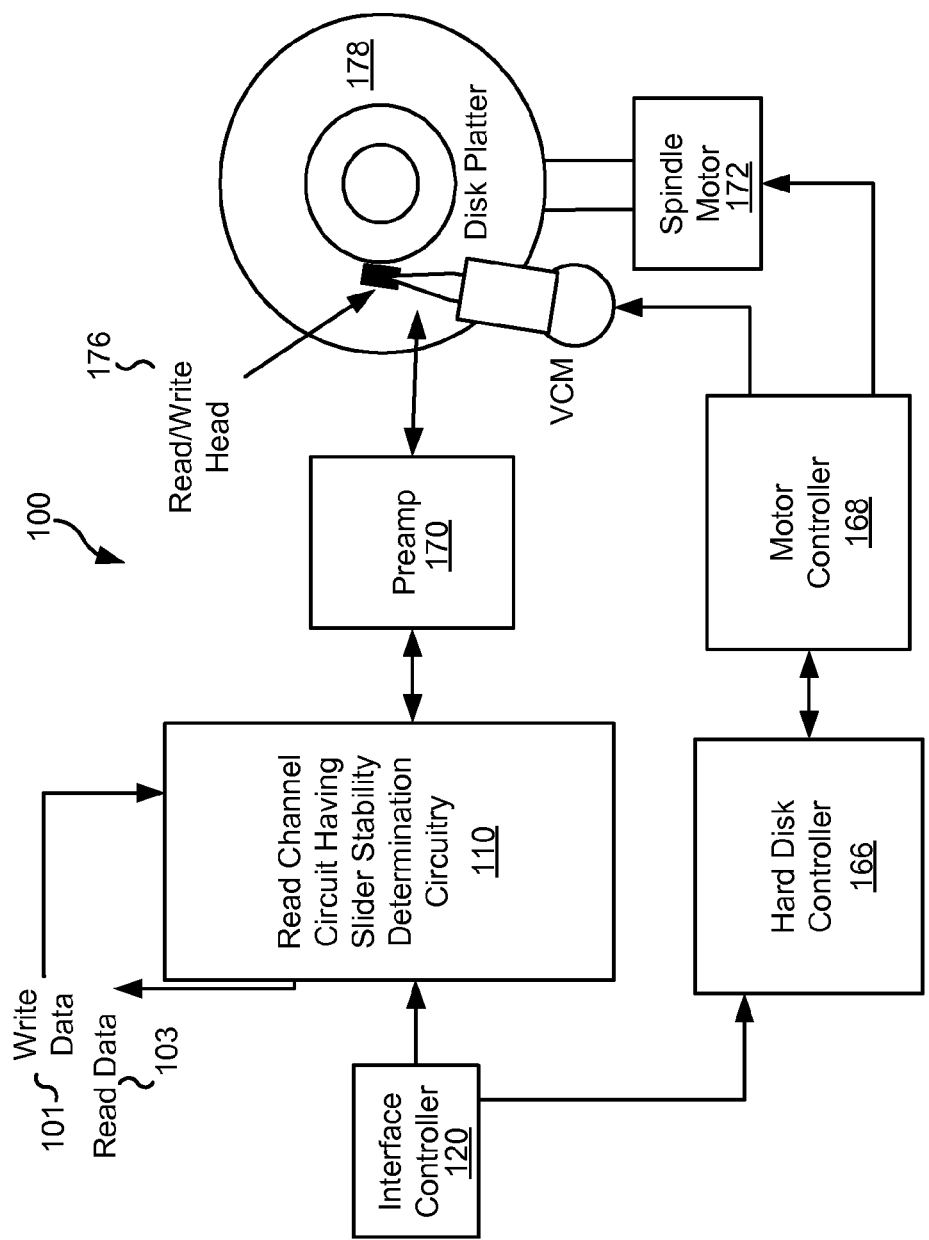
FIG. 1a shows a storage device including a read channel circuit having slider stability determination circuitry in accordance with various embodiments of the present invention.

The present inventions are related to systems and methods for data storage, and more particularly to systems and methods for determining head stability in a storage system.

Various embodiments of the present invention provide slider stability determination circuits that include: a first signal to noise estimation circuit operable to calculate a first signal to noise ratio associated with a first read sensor; a second signal to noise estimation circuit operable to calculate a second signal to noise ratio associated with a second read sensor; a summation circuit operable to subtract the first signal to noise ratio from the second signal to noise ratio to yield a delta signal to noise ratio; and a stability determination circuit operable to determine a slider stability based at least in part on the delta signal to noise ratio.

In some instances of the aforementioned embodiments, the stability determination circuit includes a comparator circuit operable to compare a magnitude of the delta signal to noise ratio with a threshold value to yield a slider stability output. In some cases, the threshold value is a fixed value, while in other cases the threshold value is a user programmable value. In one or more cases, the slider stability output is asserted to indicate instability when the delta signal to noise ratio is greater than the threshold value. In various cases, the slider stability output is asserted to indicate stability when the delta signal to noise ratio is greater than the threshold value.

In various instances of the aforementioned embodiments, the slider stability determination circuit is implemented as part of a storage device. In some cases, the storage device includes a slider having at least the first read sensor and the second read sensor, and the slider is disposed in relation to a storage medium. In some cases, the storage medium includes a servo data region and a user data region, wherein the first signal to noise ratio associated with the first read sensor is calculated based upon data derived from the servo data region. In some such cases, the second signal to noise ratio associated with the second read sensor is calculated based upon data derived from the servo data region.

In various instances of the aforementioned embodiments, the slider stability determination circuit further includes: a first analog to digital conversion circuit operable to convert a first analog input derived from the first read sensor to yield a first series of digital samples; and a second analog to digital conversion circuit operable to convert a second analog input derived from the second read sensor to yield a second series of digital samples. The first signal to noise ratio is calculated based upon the first series of digital samples, and the second signal to noise ratio is calculated based upon the second series of digital samples. In some instances of the aforementioned embodiments, the slider stability determination circuit further includes: a first analog to digital conversion circuit operable to convert a first analog input derived from the first read sensor to yield a first series of digital samples; a first filter circuit operable to filter the first series of digital samples to yield a first filtered output; a second analog to digital conversion circuit operable to convert a second analog input derived from the second read sensor to yield a second series of digital samples; and a second filter circuit operable to filter the second series of digital samples to yield a second filtered output. The first signal to noise ratio is calculated based upon the first filtered output, and the second signal to noise ratio is calculated based upon the second filtered output.

Other embodiments of the present invention provide methods for determining slider status in a storage device. The methods include: providing a slider including a first read sensor and a second read sensor; receiving a first sensed data set from the first read sensor and a second sensed data set from the second read sensor; estimating a first signal to noise ratio corresponding to the first sensed data set; estimating a second signal to noise ratio corresponding to the second sensed data set; and determining a stability status of the slider based at least in part on the first signal to noise ratio and the second signal to noise ratio.

In some instances of the aforementioned embodiments, the methods further include subtracting the first signal to noise ratio from the second signal to noise ratio to yield a delta signal to noise ratio. The stability determination circuit is operable to determine the slider stability based at least in part on the delta signal to noise ratio. In some cases, determining the stability status includes comparing a magnitude of the delta signal to noise ratio with a threshold value to yield a slider stability output.

Yet other embodiments of the present invention provide storage devices that include: a storage medium, a slider disposed in relation to the storage medium, and a slider stability determination circuit. The slider includes a first read sensor and a second read sensor. The slider stability determination circuit includes: a first signal to noise estimation circuit operable to calculate a first signal to noise ratio based upon data derived from the first read sensor; a second signal to noise estimation circuit operable to calculate a second signal to noise ratio based upon data derived from the second read sensor; and a stability determination circuit operable to determine a stability status of the slider based at least in part on the first signal to noise ratio and the second signal to noise ratio.

Turning to FIG. 1a, a storage system 100 is shown that includes a read channel 110 having slider stability determination circuitry in accordance with one or more embodiments of the present invention. Storage system 100 may be, for example, a hard disk drive. Storage system 100 also includes a preamplifier 170, an interface controller 120, a hard disk controller 166, a motor controller 168, a spindle motor 172, a disk platter 178, and a read/write head 176. Interface controller 120 controls addressing and timing of data to/from disk platter 178, and interacts with a host controller (not shown). The data on disk platter 178 consists of groups of magnetic signals that may be detected by read/write head assembly 176 when the assembly is properly positioned over disk platter 178. As used herein, the term "slider" is used in its broadest sense to mean a device disposable over a storage medium and including read/write head sensors operable to sense information on the storage medium and/or to write data to the storage medium. Thus a slider reads on a read/write head assembly. In one embodiment, disk platter 178 includes magnetic signals recorded in accordance with either a longitudinal or a perpendicular recording scheme.

In a typical read operation, read/write head 176 is accurately positioned by motor controller 168 over a desired data track on disk platter 178. Motor controller 168 both positions read/write head 176 in relation to disk platter 178 and drives spindle motor 172 by moving read/write head assembly 176 to the proper data track on disk platter 178 under the direction of hard disk controller 166. Spindle motor 172 spins disk platter 178 at a determined spin rate (RPMs). Once read/write head 176 is positioned adjacent the proper data track, magnetic signals representing data on disk platter 178 are sensed by read/write head 176 as disk platter 178 is rotated by spindle motor 172. The sensed magnetic signals are provided as a continuous, minute analog signal representative of the magnetic data on disk platter 178. This minute analog signal is transferred from read/write head 176 to read channel circuit 110 via preamplifier 170. Preamplifier 170 is operable to amplify the minute analog signals accessed from disk platter 178. In turn, read channel circuit 110 decodes and digitizes the received analog signal to recreate the information originally written to disk platter 178. This data is provided as read data 103 to a receiving circuit. A write operation is substantially the opposite of the preceding read operation with write data 101 being provided to read channel circuit 110. This data is then encoded and written to disk platter 178.

In operation, data accessed via different read sensors on read/write head assembly 176 is analyzed to determine whether the slider is stable. In some cases, a first signal to noise ratio for data derived from a first read sensor and a second signal to noise ratio for data derived from a first read sensor are calculated. These signal to noise ratios are used to determine whether the slider is stable, or whether it is pitching and/or rolling relative to disk platter 178. The stability determination may be done using a circuit similar to one of FIG. 4 or FIG. 6 discussed below. The stability determination may be made using an approach similar to that discussed below in relation to FIG. 5 or FIG. 7.

It should be noted that storage system 100 may be integrated into a larger storage system such as, for example, a RAID (redundant array of inexpensive disks or redundant array of independent disks) based storage system. Such a RAID storage system increases stability and reliability through redundancy, combining multiple disks as a logical unit. Data may be spread across a number of disks included in the RAID storage system according to a variety of algorithms and accessed by an operating system as if it were a single disk. For example, data may be mirrored to multiple disks in the RAID storage system, or may be sliced and distributed across multiple disks in a number of techniques. If a small number of disks in the RAID storage system fail or become unavailable, error correction techniques may be used to recreate the missing data based on the remaining portions of the data from the other disks in the RAID storage system. The disks in the RAID storage system may be, but are not limited to, individual storage systems such as storage system 100, and may be located in close proximity to each other or distributed more widely for increased security. In a write operation, write data is provided to a controller, which stores the write data across the disks, for example by mirroring or by striping the write data. In a read operation, the controller retrieves the data from the disks. The controller then yields the resulting read data as if the RAID storage system were a single disk.

A data decoder circuit used in relation to read channel circuit 110 may be, but is not limited to, a low density parity check (LDPC) decoder circuit as are known in the art. Such low density parity check technology is applicable to transmission of information over virtually any channel or storage of information on virtually any media. Transmission applications include, but are not limited to, optical fiber, radio frequency channels, wired or wireless local area networks, digital subscriber line technologies, wireless cellular, Ethernet over any medium such as copper or optical fiber, cable channels such as cable television, and Earth-satellite communications. Storage applications include, but are not limited to, hard disk drives, compact disks, digital video disks, magnetic tapes and memory devices such as DRAM, NAND flash, NOR flash, other non-volatile memories and solid state drives.

In addition, it should be noted that storage system 100 may be modified to include solid state memory that is used to store data in addition to the storage offered by disk platter 178. This solid state memory may be used in parallel to disk platter 178 to provide additional storage. In such a case, the solid state memory receives and provides information directly to read channel circuit 110. Alternatively, the solid state memory may be used as a cache where it offers faster access time than that offered by disk platted 178. In such a case, the solid state memory may be disposed between interface controller 120 and read channel circuit 110 where it operates as a pass through to disk platter 178 when requested data is not available in the solid state memory or when the solid state memory does not have sufficient storage to hold a newly written data set. Based upon the disclosure provided herein, one of ordinary skill in the art will recognize a variety of storage systems including both disk platter 178 and a solid state memory.

Figure 1B:
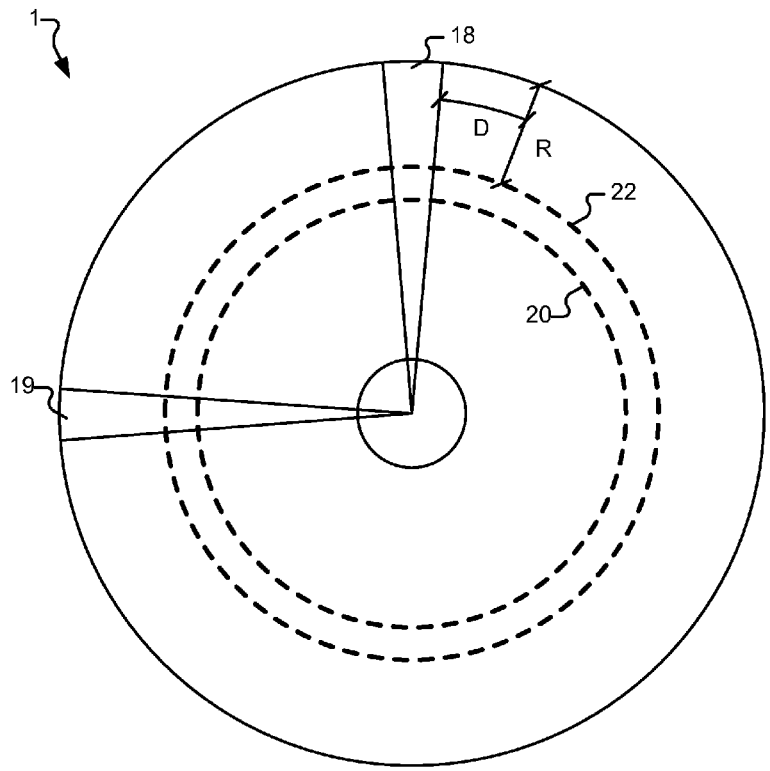
FIG. 1b is a block diagram of a magnetic storage medium and sector data scheme including wedges of sector data that is coherent from track to track with intervening user data that is not necessarily coherent from track to track that may be used in relation to different embodiments of the present invention.
Figure 1B:
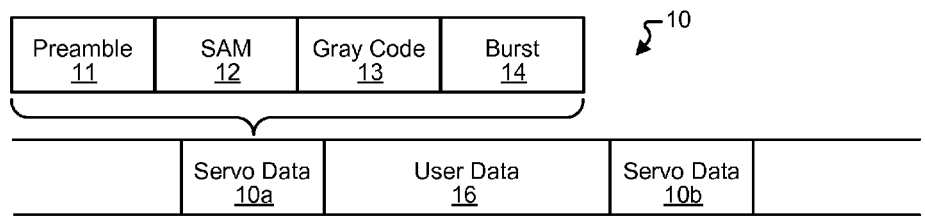
Figure 1B:
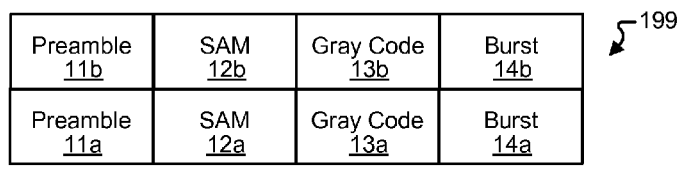

Turning to FIG. 1b, a storage medium 1 is shown with two exemplary tracks 20, 22 indicated as dashed lines. Storage medium 1 may be used in place of disk platter 178. The tracks are divided into sectors by servo data written within wedges 19, 18. These wedges include servo data 10 that are used for control and synchronization of a read/write head assembly over a desired location on storage medium 1. In particular, this servo data generally includes a preamble pattern 11 followed by a sector address mark 12 (SAM). Sector address mark 12 may include address information followed by the SAM. Sector address mark 12 is followed by a Gray code 13 which may include wedge identification information, and Gray code 13 is followed by burst information 14. Gray code 13 may include track identification information. It should be noted that while two tracks and two wedges are shown, hundreds of each would typically be included on a given storage medium. Further, it should be noted that a servo data set may have two or more fields of burst information. Yet further, it should be noted that different information may be included in the servo fields such as, for example, repeatable run-out information that may appear after burst information 14. As shown by a graphic 199, the information in wedges is substantially aligned from one track to the next leading to field coherence regardless of whether two or more read sensors on read/write head assembly 176 are over the same track or different tracks. Of note, various wedge data changes from track to track, but preamble data from the wedges is data coherent from track to track. As such, use of preamble data from wedges 18, 19 to make stability determinations is not sensitive to alignment of read/write head assembly 176 relative to the center of a track. Between the servo data bit patterns 10a and 10b, a user data region 16 is provided. User data portion 16 is not necessarily coherent from track to track.

In operation, storage medium 1 is rotated in relation to sensors on read/write head assembly 176 to sense information from disk platter 178. In a read operation, the sensor would sense servo data from wedge 19 (i.e., during a servo data period) followed by user data from a user data region between wedge 19 and wedge 18 (i.e., during a user data period) and then servo data from wedge 18. The data from the sensors is then used to determine slider stability.

Figure 2A:
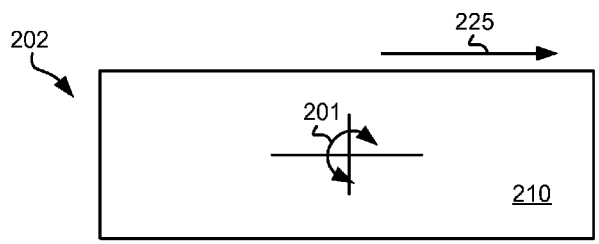
FIG. 2a shows a cross sectional view of a slider exhibiting a pitch movement.
Figure 2B:
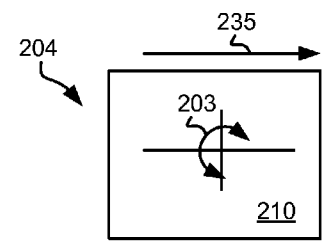
FIG. 2b shows another cross sectional view of the slider of FIG. 2a exhibiting a roll movement.
Figure 2C:
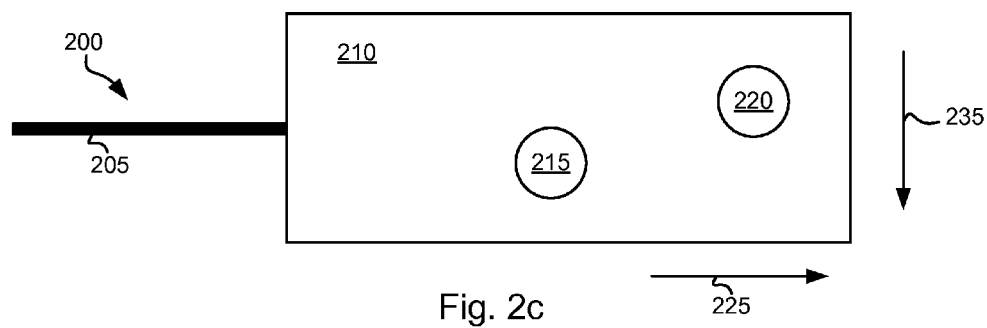
FIG. 2c shows a bottom view of the slider of FIGS. 2a-2b including two read sensors.

Turning to FIGS. 2a-2b, two cross-sectional views of a slider 210 are shown. In particular, a side cross-sectional view 202 shows slider 210 in a down track direction 225, and a front cross-sectional view 204 shows slider 210 in a cross track direction 235. A rotational axis 201 on side cross-sectional view 202 shows pitching of slider 210, and a rotational axis 203 on front cross-sectional view 204 shows rolling of slider 210. Of note, slider 210 may be both pitching and rolling a the same time. Turning to FIG. 2c, a bottom view 200 of slider 210 is shown. As shown, slider 210 is attached to an arm 205 by which it is controlled. Slider 210 includes two read sensors 215, 220 with one located upstream in down track direction 225, and one offset from the other in cross track direction 235. Read sensors 215, 220 may be any sensor known in the art that is capable of sensing information from a storage medium. In one particular embodiment of the present invention, read sensors 215, 220 may be magnetic read sensors as are known in the art. Based upon the disclosure provided herein, one of ordinary skill in the art will recognize other types of read sensors that may be used in relation to different embodiments of the present invention. It should be noted that while this embodiment is discussed in relation to a slider having two read sensors, other embodiments of the present invention may utilize a slider having three or more read sensors.

Figure 2D:
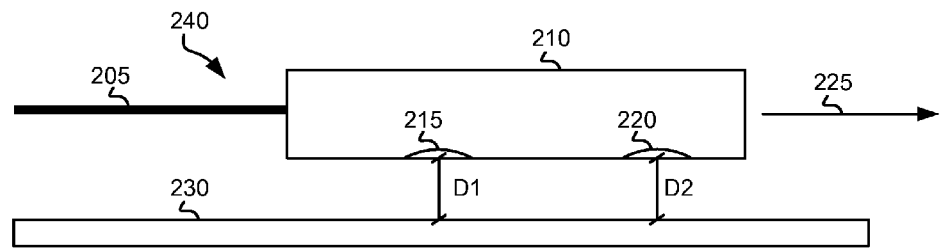
FIG. 2d shows the cross-sectional view of the slider of FIG. 2a disposed in relation to a storage medium and exhibiting a zero pitch.

Turning to FIG. 2d, a side cross-sectional view 240 of slider 210 is shown exhibiting a zero pitch relative to a storage medium 230. In this zero pitch orientation, a distance (D1) from read sensor 215 to storage medium 230 is substantially equal to a distance (D2) from read sensor 220 to storage medium 230. As the distances D1, D2 are equal, a similar signal to noise ratio should occur in the signal received from read sensor 215 and read sensor 220. Thus, by determining that the signal to noise ratio of the signal received from read sensor 215 is similar to the signal to noise ratio of the signal received from read sensor 220, it can be reasonably assumed that slider 210 is operating at a low pitch and is therefore stable. In some cases calibration of signal to noise ratio offset may be performed prior to stability analysis where the difference between the signal to noise ratio of the sensors is non-zero.

Figure 2E:
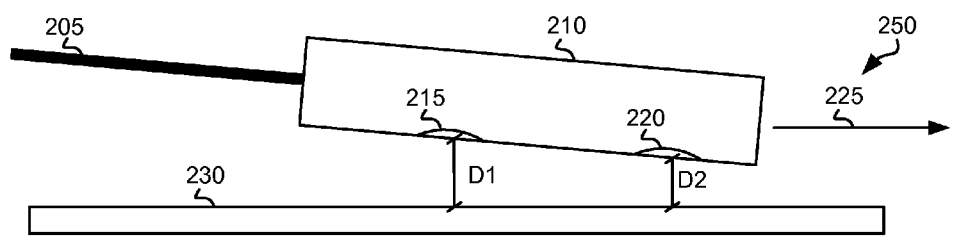
FIG. 2e shows the cross-sectional view of the slider of FIG. 2a disposed in relation to the storage medium and exhibiting a forward pitch.

Turning to FIG. 2e, a side cross-sectional view 250 of slider 210 is shown exhibiting a forward pitch relative to storage medium 230. In this forward pitch orientation, distance (D1) from read sensor 215 to storage medium 230 is greater than distance (D2) from read sensor 220 to storage medium 230. As distance D1 is appreciably greater than distance D2, a signal to noise ratio of the signal received from read sensor 215 should be measurably less than a signal to noise ratio of the signal received from read sensor 220. Thus, by determining that the signal to noise ratio of the signal received from read sensor 215 is less than the signal to noise ratio of the signal received from read sensor 220, it can be reasonably assumed that slider 210 is operating at an appreciable, possible forward pitch and is therefore unstable. Of note, a similar disparity in signal to noise ratios may indicate a roll scenario similar to one of those discussed below in relation to FIGS. 2h-2i. It should be noted that by adding a third read sensor to slider 210 a roll can be distinguished from a pitch, however, as either an appreciable roll or an appreciable pitch indicates instability, the third read sensor may not be needed.

Figure 2F:
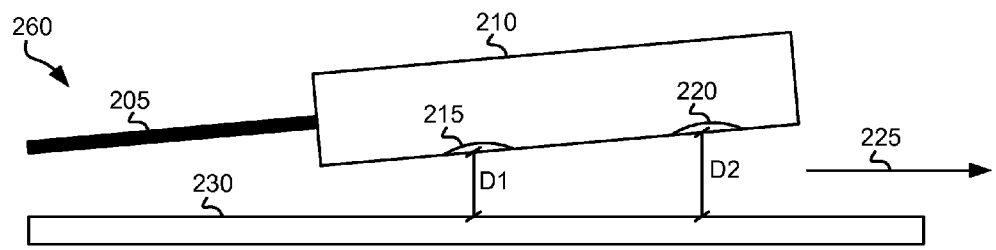
FIG. 2f shows the cross-sectional view of the slider of FIG. 2a disposed in relation to the storage medium and exhibiting a reverse pitch.

Turning to FIG. 2f, a side cross-sectional view 260 of slider 210 is shown exhibiting a reverse pitch relative to storage medium 230. In this reverse pitch orientation, distance (D1) from read sensor 215 to storage medium 230 is less than distance (D2) from read sensor 220 to storage medium 230. As distance D1 is appreciably less than distance D2, a signal to noise ratio of the signal received from read sensor 215 should be measurably greater than a signal to noise ratio of the signal received from read sensor 220. Thus, by determining that the signal to noise ratio of the signal received from read sensor 215 is greater than the signal to noise ratio of the signal received from read sensor 220, it can be reasonably assumed that slider 210 is operating at an appreciable, possible reverse pitch and is therefore unstable. Again, a similar disparity in signal to noise ratios may indicate a roll scenario similar to one of those discussed below in relation to FIGS. 2h-2i. It should be noted that by adding a third read sensor to slider 210 a roll can be distinguished from a pitch, however, as either an appreciable roll or an appreciable pitch indicates instability, the third read sensor may not be needed.

Figure 2G:
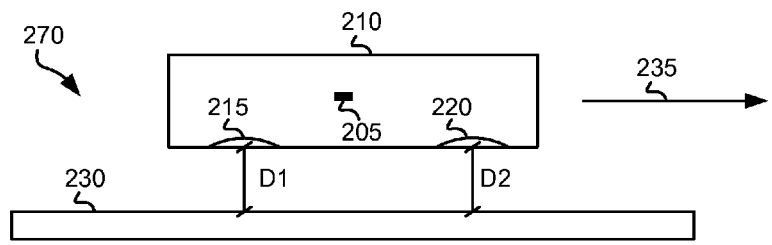
FIG. 2g shows the cross-sectional view of the slider of FIG. 2b disposed in relation to the storage medium and exhibiting a zero roll.

Turning to FIG. 2g, a front cross-sectional view 270 of slider 210 is shown exhibiting a zero roll relative to a storage medium 230. In this zero roll orientation, a distance (D1) from read sensor 215 to storage medium 230 is substantially equal to a distance (D2) from read sensor 220 to storage medium 230. As the distances D1, D2 are equal, a similar signal to noise ratio should occur in the signal received from read sensor 215 and read sensor 220. Thus, by determining that the signal to noise ratio of the signal received from read sensor 215 is similar to the signal to noise ratio of the signal received from read sensor 220, it can be reasonably assumed that slider 210 is operating at a low roll and is therefore stable. In some cases calibration of signal to noise ratio offset may be performed prior to stability analysis where the difference between the signal to noise ratio of the sensors is non-zero.

Figure 2H:
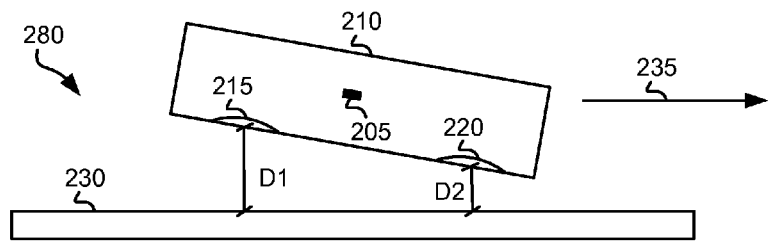
FIG. 2h shows the cross-sectional view of the slider of FIG. 2b disposed in relation to the storage medium and exhibiting a right roll.

Turning to FIG. 2h, a front cross-sectional view 280 of slider 210 is shown exhibiting a right roll relative to storage medium 230. In this right roll orientation, distance (D1) from read sensor 215 to storage medium 230 is greater than distance (D2) from read sensor 220 to storage medium 230. As distance D1 is appreciably greater than distance D2, a signal to noise ratio of the signal received from read sensor 215 should be measurably less than a signal to noise ratio of the signal received from read sensor 220. Thus, by determining that the signal to noise ratio of the signal received from read sensor 215 is less than the signal to noise ratio of the signal received from read sensor 220, it can be reasonably assumed that slider 210 is operating at an appreciable, possible right roll and is therefore unstable. Of note, a similar disparity in signal to noise ratios may indicate a pitch scenario similar to one of those discussed above in relation to FIGS. 2e-2f. It should be noted that by adding a third read sensor to slider 210 a roll can be distinguished from a pitch, however, as either an appreciable roll or an appreciable pitch indicates instability, the third read sensor may not be needed.

Figure 2I:
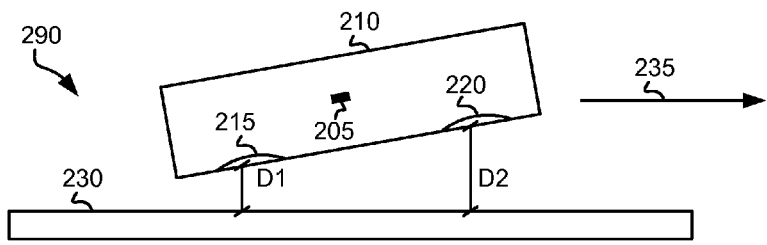
FIG. 2i shows the cross-sectional view of the slider of FIG. 2b disposed in relation to the storage medium and exhibiting a left roll.

Turning to FIG. 2i, a front cross-sectional view 290 of slider 210 is shown exhibiting a left roll relative to storage medium 230. In this left roll orientation, distance (D1) from read sensor 215 to storage medium 230 is less than distance (D2) from read sensor 220 to storage medium 230. As distance D1 is appreciably less than distance D2, a signal to noise ratio of the signal received from read sensor 215 should be measurably greater than a signal to noise ratio of the signal received from read sensor 220. Thus, by determining that the signal to noise ratio of the signal received from read sensor 215 is greater than the signal to noise ratio of the signal received from read sensor 220, it can be reasonably assumed that slider 210 is operating at an appreciable, possible left roll and is therefore unstable. Again, a similar disparity in signal to noise ratios may indicate a pitch scenario similar to one of those discussed above in relation to FIGS. 2e-2f. It should be noted that by adding a third read sensor to slider 210 a roll can be distinguished from a pitch, however, as either an appreciable roll or an appreciable pitch indicates instability, the third read sensor may not be needed.

Figure 3:
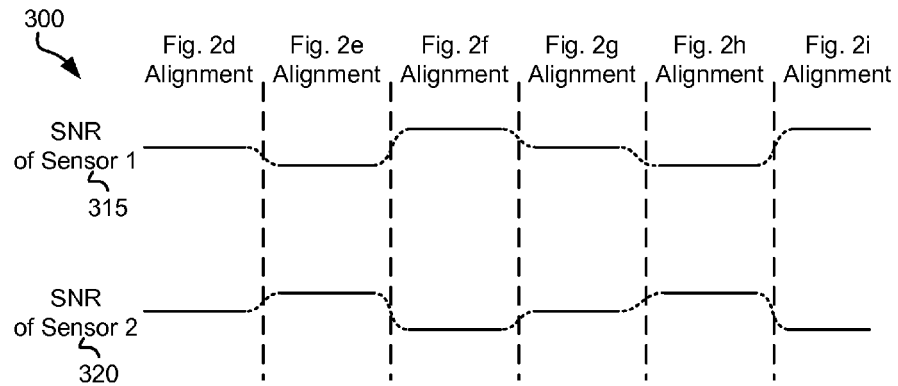
FIG. 3 is a timing diagram showing relative signal to noise ratio values for each of the heads on the slider of FIGS. 2a-2i for the alignments shown above in relation to FIGS. 2d-2i.

Turning to FIG. 3, a timing diagram 300 shows relative signal to noise ratio values for a first sensor 315 (corresponding to a signal from read sensor 215 of FIG. 2) and a second sensor 320 (corresponding to a signal from read sensor 220 of FIG. 2). As shown, when slider 210 is aligned with storage medium 230 consistent with that shown in FIG. 2d, the signal to noise ratios are substantially equal (although they are shown offset from one another. In this orientation, the delta in signal to noise ratios between the two sensors is low. Alternatively, when slider 210 is aligned with storage medium 230 consistent with that shown in FIG. 2e, the signal to noise ratio of first sensor 315 is reduced, and the signal to noise ratio of second sensor 320 is increased. This combination of reducing signal to noise ratio and increased signal to noise ratio results in a detectable difference in the delta in signal to noise ratios between the two sensors. As another alternative, when slider 210 is aligned with storage medium 230 consistent with that shown in FIG. 2f, the signal to noise ratio of first sensor 315 is increased, and the signal to noise ratio of second sensor 320 is decreased. This combination of reducing signal to noise ratio and increased signal to noise ratio results in a detectable difference in the delta in signal to noise ratios between the two sensors.

When slider 210 is aligned with storage medium 230 consistent with that shown in FIG. 2g, the signal to noise ratios are substantially equal (although they are shown offset from one another. In this orientation, the delta in signal to noise ratios between the two sensors is low. Alternatively, when slider 210 is aligned with storage medium 230 consistent with that shown in FIG. 2h, the signal to noise ratio of first sensor 315 is reduced, and the signal to noise ratio of second sensor 320 is increased. This combination of reducing signal to noise ratio and increased signal to noise ratio results in a detectable difference in the delta in signal to noise ratios between the two sensors. As another alternative, when slider 210 is aligned with storage medium 230 consistent with that shown in FIG. 2i, the signal to noise ratio of first sensor 315 is increased, and the signal to noise ratio of second sensor 320 is decreased. This combination of reducing signal to noise ratio and increased signal to noise ratio results in a detectable difference in the delta in signal to noise ratios between the two sensors.

Figure 4:
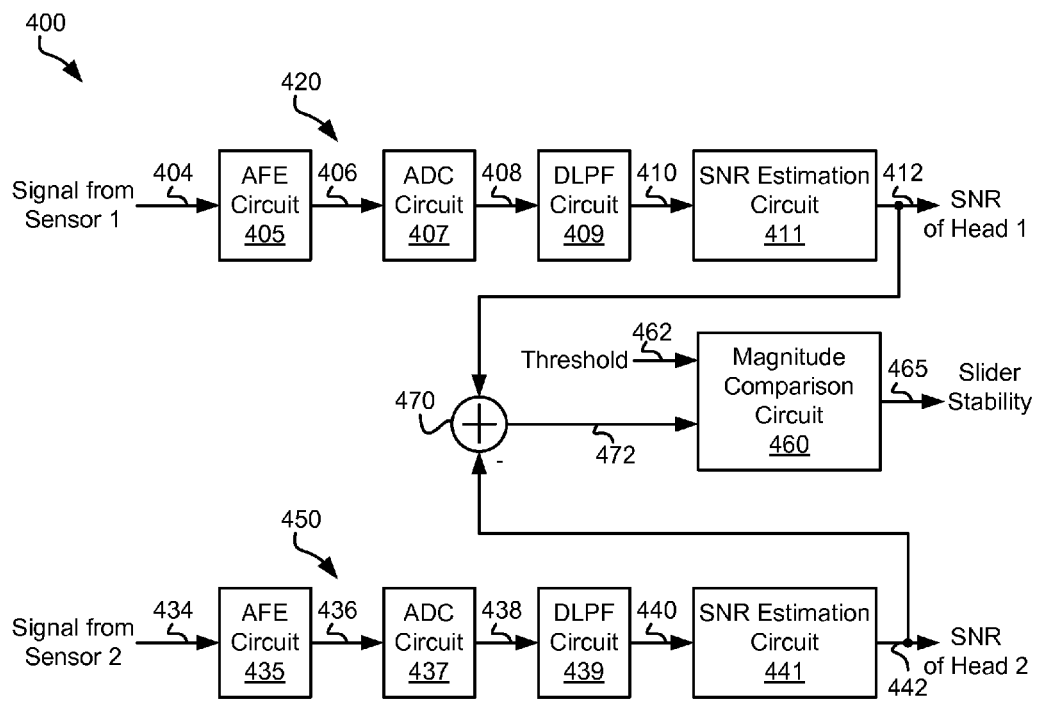
FIG. 4 depicts a slider stability determination circuit in accordance with one or more embodiments of the present invention.

Turning to FIG. 4, depicts a slider stability determination circuit 400 in accordance with one or more embodiments of the present invention. Slider stability determination circuit 400 includes a first sensor processing path 420 and a second sensor processing path 450.

First sensor processing path 420 includes an analog front end circuit 405 that receives an analog input 404 derived from a first sensor (e.g., read sensor 215 of FIG. 2). Analog front end circuit 405 processes analog input 404 and provides a processed analog signal 406 to an analog to digital converter circuit 407. Analog front end circuit 405 may include, but is not limited to, an analog filter and an amplifier circuit as are known in the art. Based upon the disclosure provided herein, one of ordinary skill in the art will recognize a variety of circuitry that may be included as part of analog front end circuit 405.

Analog to digital converter circuit 407 converts processed analog signal 406 into a corresponding series of digital samples 408. Analog to digital converter circuit 407 may be any circuit known in the art that is capable of producing digital samples corresponding to an analog input signal. Based upon the disclosure provided herein, one of ordinary skill in the art will recognize a variety of analog to digital converter circuits that may be used in relation to different embodiments of the present invention. Digital samples 408 are provided to a digital low pass filter circuit 409 that filters the input to yield a filtered output 410. Digital low pass filter circuit 409 may be any filtering circuit known in the art. Filtered output 410 is provided to a signal to noise ratio estimation circuit 411 that calculates a signal to noise ratio based upon filtered output 410, and provides the calculated value as an SNR of the first sensor 412. In some embodiments of the present invention, signal to noise ratio estimation circuit 411 calculates the signal to noise ratio based upon data from one or more servo wedges (e.g., wedges 18, 19 of FIG. 1b).

In some cases, the preamble pattern of the servo wedges is used for the calculation. Use of the servo wedge data makes operation of slider stability determination circuit 400 less sensitive to alignment of the slide to a particular track on the storage medium as the data within the servo wedges is coherent across tracks. That said, other embodiments of the present invention may be designed to use data derived from non-servo data regions. Signal to noise ratio estimation circuit 411 may be any circuit known in the art that is capable of estimating signal to noise ratio data based upon information accessed from a storage medium. As one example, signal to noise ratio estimation circuit 411 may be implemented similar to that disclosed in US Pat. Pub. No. 2013/0148233 entitled "Systems and Methods for SNR Measurement Using Equalized Data" and filed Dec. 12, 2011 by Xia et al. The entirety of the aforementioned reference is incorporated herein by reference for all purposes.

Second sensor processing path 450 includes an analog front end circuit 435 that receives an analog input 434 derived from a second sensor (e.g., read sensor 220 of FIG. 2). Analog front end circuit 435 processes analog input 434 and provides a processed analog signal 436 to an analog to digital converter circuit 437. Analog front end circuit 435 may include, but is not limited to, an analog filter and an amplifier circuit as are known in the art. Based upon the disclosure provided herein, one of ordinary skill in the art will recognize a variety of circuitry that may be included as part of analog front end circuit 435.

Analog to digital converter circuit 437 converts processed analog signal 436 into a corresponding series of digital samples 438. Analog to digital converter circuit 437 may be any circuit known in the art that is capable of producing digital samples corresponding to an analog input signal. Based upon the disclosure provided herein, one of ordinary skill in the art will recognize a variety of analog to digital converter circuits that may be used in relation to different embodiments of the present invention. Digital samples 438 are provided to a digital low pass filter circuit 439 that filters the input to yield a filtered output 440. Digital low pass filter circuit 439 may be any filtering circuit known in the art. Filtered output 440 is provided to a signal to noise ratio estimation circuit 441 that calculates a signal to noise ratio based upon filtered output 440, and provides the calculated value as an SNR of the second sensor 442. In some embodiments of the present invention, signal to noise ratio estimation circuit 441 calculates the signal to noise ratio based upon data from one or more servo wedges (e.g., wedges 18, 19 of FIG. 1b). Signal to noise ratio estimation circuit 441 may be any circuit known in the art that is capable of estimating signal to noise ratio data based upon information accessed from a storage medium. Again, as one example, signal to noise ratio estimation circuit 441 may be implemented similar to that disclosed in US Pat. Pub. No. 2013/0148233 entitled "Systems and Methods for SNR Measurement Using Equalized Data" and filed Dec. 12, 2011 by Xia et al.

SNR of the second sensor 442 is subtracted from SNR of the second sensor 442 by a summation circuit 470 to yield an SNR delta value 472. SNR delta value 472 is provided to a magnitude comparison circuit 460 where it is compared with a threshold value 462. Threshold value 462 may be either fixed or user programmable. Where magnitude comparison circuit 460 determines that the magnitude of SNR delta value 472 is greater than threshold value 462, magnitude comparison circuit 460 asserts a slider stability output 465 indicating that the slider is unstable. Otherwise, magnitude comparison circuit 460 de-asserts slider stability output 465 indicating that the slider is stable. The following pseudocode describes the operation of magnitude comparison circuit 460:

If(SNR delta value 472>Threshold value 462 OR
SNR delta value 472<−Threshold value){
   Assert Slider Stability Output 465 Indicating an
     Unstable Slider
}
Else{
De-assert Slider Stability Output 465 Indicating a Stable
   Slider
}

Figure 5:
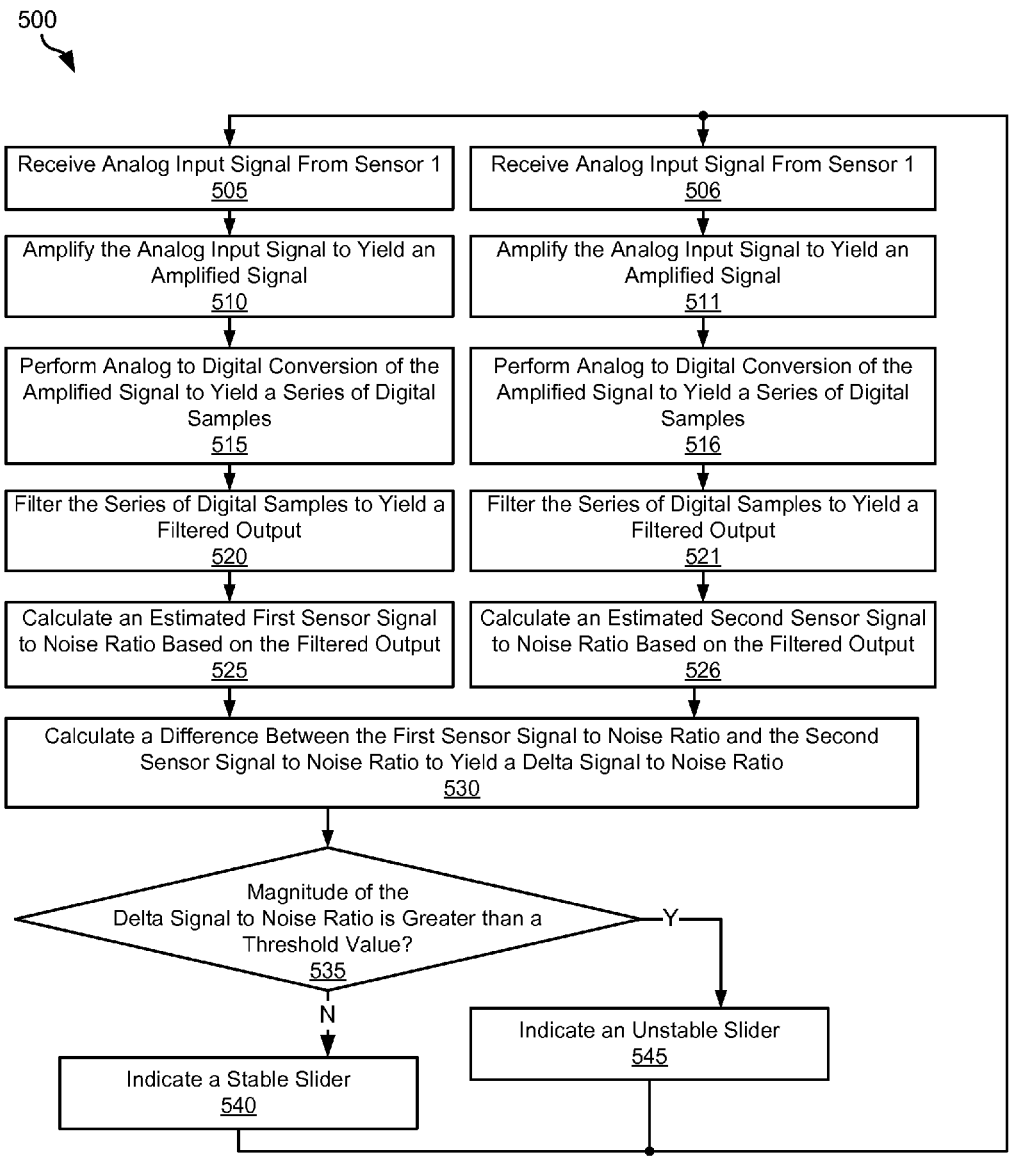
FIG. 5 is a flow diagram showing a method in accordance with some embodiments of the present invention for determining slider stability.

Turning to FIG. 5, a flow diagram 500 shows a method in accordance with some embodiments of the present invention for determining slider stability. Following flow diagram 500, an analog input signal is received from a first sensor (e.g., read sensor 215 of FIG. 2) (block 505). The analog input is amplified to yield an amplified signal (block 510). An analog to digital conversion is applied to the amplified signal to yield a series of digital samples (block 515). The series of digital samples are then filtered to yield a filtered output (block 520).

An estimate of the signal to noise ratio of data derived from the first sensor is then calculated to yield a first sensor signal to noise ratio (block 525).

In parallel, an analog input signal is received from a first sensor (e.g., read sensor 220 of FIG. 2) (block 506). The analog input is amplified to yield an amplified signal (block 511). An analog to digital conversion is applied to the amplified signal to yield a series of digital samples (block 516), and the series of digital samples are then filtered to yield a filtered output (block 521). An estimate of the signal to noise ratio of data derived from the second sensor is then calculated to yield a first sensor signal to noise ratio (block 526).

A difference between the first sensor signal to noise ratio and the second sensor signal to noise ratio is calculated as a delta signal to noise ratio (block 530). It is then determined whether a magnitude of the delta signal to noise ratio is greater than a threshold value (block 535). Where the magnitude of the delta signal to noise ratio is greater than the threshold value, an unstable slider is indicated (block 545). Otherwise, where the magnitude of the delta signal to noise ratio is not greater than the threshold value, a stable slider is indicated (block 540).

Figure 6:
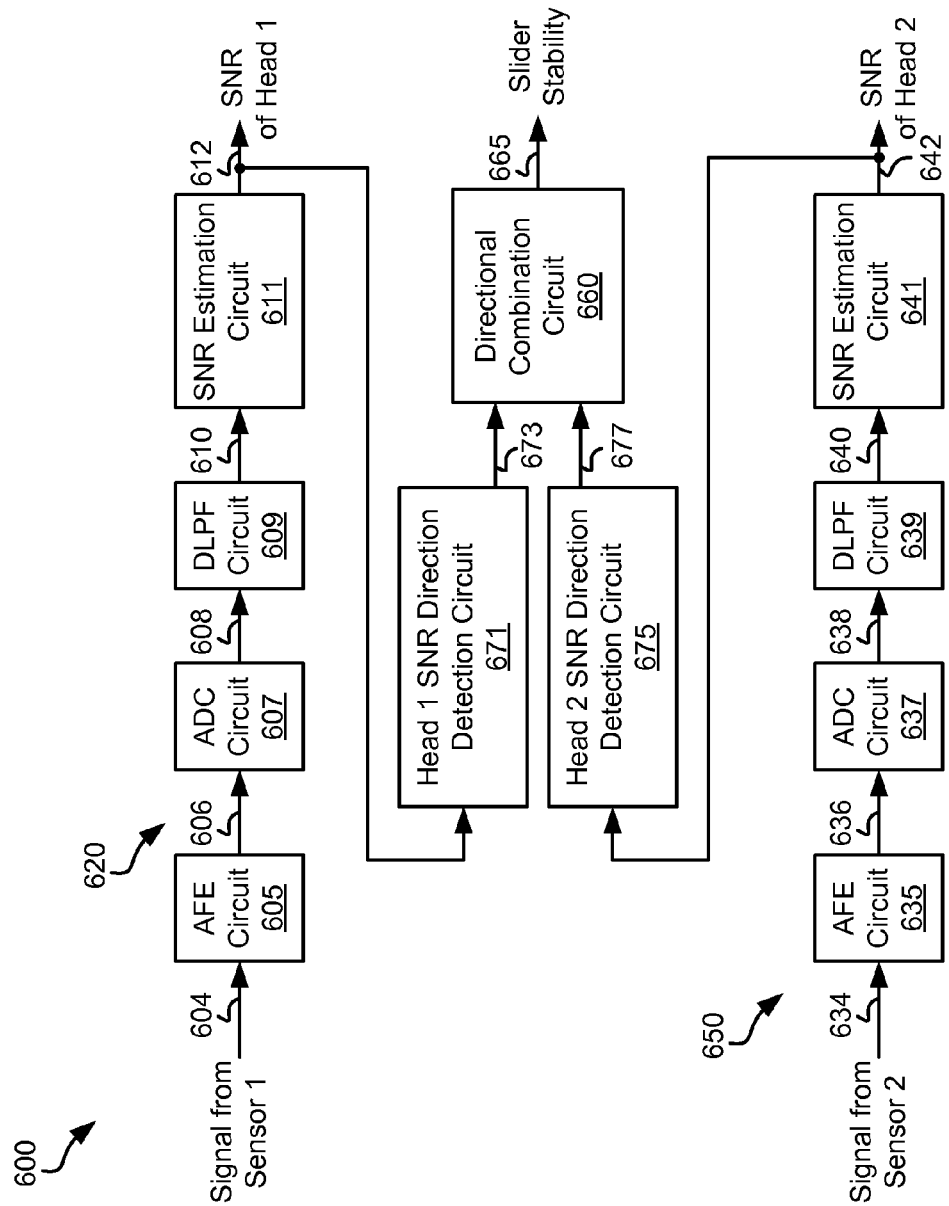
FIG. 6 depicts another slider stability determination circuit in accordance with other embodiments of the present invention.

Turning to FIG. 6, depicts another slider stability determination circuit 600 in accordance with other embodiments of the present invention. Slider stability determination circuit 600 includes a first sensor processing path 620 and a second sensor processing path 650.

First sensor processing path 620 includes an analog front end circuit 605 that receives an analog input 604 derived from a first sensor (e.g., read sensor 215 of FIG. 2). Analog front end circuit 605 processes analog input 604 and provides a processed analog signal 606 to an analog to digital converter circuit 607. Analog front end circuit 605 may include, but is not limited to, an analog filter and an amplifier circuit as are known in the art. Based upon the disclosure provided herein, one of ordinary skill in the art will recognize a variety of circuitry that may be included as part of analog front end circuit 605.

Analog to digital converter circuit 607 converts processed analog signal 606 into a corresponding series of digital samples 608. Analog to digital converter circuit 607 may be any circuit known in the art that is capable of producing digital samples corresponding to an analog input signal. Based upon the disclosure provided herein, one of ordinary skill in the art will recognize a variety of analog to digital converter circuits that may be used in relation to different embodiments of the present invention. Digital samples 608 are provided to a digital low pass filter circuit 609 that filters the input to yield a filtered output 610. Digital low pass filter circuit 609 may be any filtering circuit known in the art. Filtered output 610 is provided to a signal to noise ratio estimation circuit 611 that calculates a signal to noise ratio based upon filtered output 610, and provides the calculated value as an SNR of the first sensor 612. In some embodiments of the present invention, signal to noise ratio estimation circuit 611 calculates the signal to noise ratio based upon data from one or more servo wedges (e.g., wedges 18, 19 of FIG. 1b).

In some cases, the preamble pattern of the servo wedges is used for the calculation. Use of the servo wedge data makes operation of slider stability determination circuit 600 less sensitive to alignment of the slide to a particular track on the storage medium as the data within the servo wedges is coherent across tracks. That said, other embodiments of the present invention may be designed to use data derived from non-servo data regions. Signal to noise ratio estimation circuit 611 may be any circuit known in the art that is capable of estimating signal to noise ratio data based upon information accessed from a storage medium. As one example, signal to noise ratio estimation circuit 611 may be implemented similar to that disclosed in US Pat. Pub. No. 2013/0148233 entitled "Systems and Methods for SNR Measurement Using Equalized Data" and filed Dec. 12, 2011 by Xia et al. The entirety of the aforementioned reference was previously incorporated by reference for all purposes.

Second sensor processing path 650 includes an analog front end circuit 635 that receives an analog input 634 derived from a second sensor (e.g., read sensor 220 of FIG. 2). Analog front end circuit 635 processes analog input 634 and provides a processed analog signal 636 to an analog to digital converter circuit 637. Analog front end circuit 635 may include, but is not limited to, an analog filter and an amplifier circuit as are known in the art. Based upon the disclosure provided herein, one of ordinary skill in the art will recognize a variety of circuitry that may be included as part of analog front end circuit 635.

Analog to digital converter circuit 637 converts processed analog signal 636 into a corresponding series of digital samples 638. Analog to digital converter circuit 637 may be any circuit known in the art that is capable of producing digital samples corresponding to an analog input signal. Based upon the disclosure provided herein, one of ordinary skill in the art will recognize a variety of analog to digital converter circuits that may be used in relation to different embodiments of the present invention. Digital samples 638 are provided to a digital low pass filter circuit 639 that filters the input to yield a filtered output 640. Digital low pass filter circuit 639 may be any filtering circuit known in the art. Filtered output 640 is provided to a signal to noise ratio estimation circuit 641 that calculates a signal to noise ratio based upon filtered output 640, and provides the calculated value as an SNR of the second sensor 642. In some embodiments of the present invention, signal to noise ratio estimation circuit 641 calculates the signal to noise ratio based upon data from one or more servo wedges (e.g., wedges 18, 19 of FIG. 1b). Signal to noise ratio estimation circuit 641 may be any circuit known in the art that is capable of estimating signal to noise ratio data based upon information accessed from a storage medium. Again, as one example, signal to noise ratio estimation circuit 641 may be implemented similar to that disclosed in US Pat. Pub. No. 2013/0148233 entitled "Systems and Methods for SNR Measurement Using Equalized Data" and filed Dec. 12, 2011 by Xia et al.

SNR of the first sensor 612 is provided to a Head 1 SNR direction detection circuit 671 that identifies a direction that the signal to noise ratio of the SNR of the first sensor 612 is moving (i.e., is the signal to noise ratio increasing or decreasing). The direction of the SNR of the second sensor 612 is provided as a first direction output 673. SNR of the second sensor 642 is provided to a Head 2 SNR direction detection circuit 675 that identifies a direction that the signal to noise ratio of the SNR of the second sensor 642 is moving (i.e., is the signal to noise ratio increasing or decreasing). The direction of the SNR of the second sensor 642 is provided as a second direction output 677. First direction output 673 and second direction output 677 are provided to a directional combination circuit 660. Directional combination circuit 660 asserts a slider stability output 665 indicating that the slider is unstable based upon a defined combination of first direction output 673 and second direction output 677. Otherwise, directional combination circuit 660 de-asserts slider stability output 665 indicating that the slider is stable. The following pseudocode describes the operation of directional combination circuit 660:

```
If(First Direction Output 673 indicates decreasing and
    Second Direction Output 677 is increasing){
    /*similar to the alignment discussed in relation to FIGS.
        2e and 2h*/
    Assert Slider Stability Output 665 Indicating an
        Unstable Slider
}
Else if(First Direction Output 673 indicates increasing and
    Second Direction Output 677 is decreasing){
    /*similar to the alignment discussed in relation to FIGS.
        2f and 2i*/
    Assert Slider Stability Output 665 Indicating an
        Unstable Slider
}
Else{
    De-assert Slider Stability Output 665 Indicating a Stable
        Slider
}
```

Figure 7:
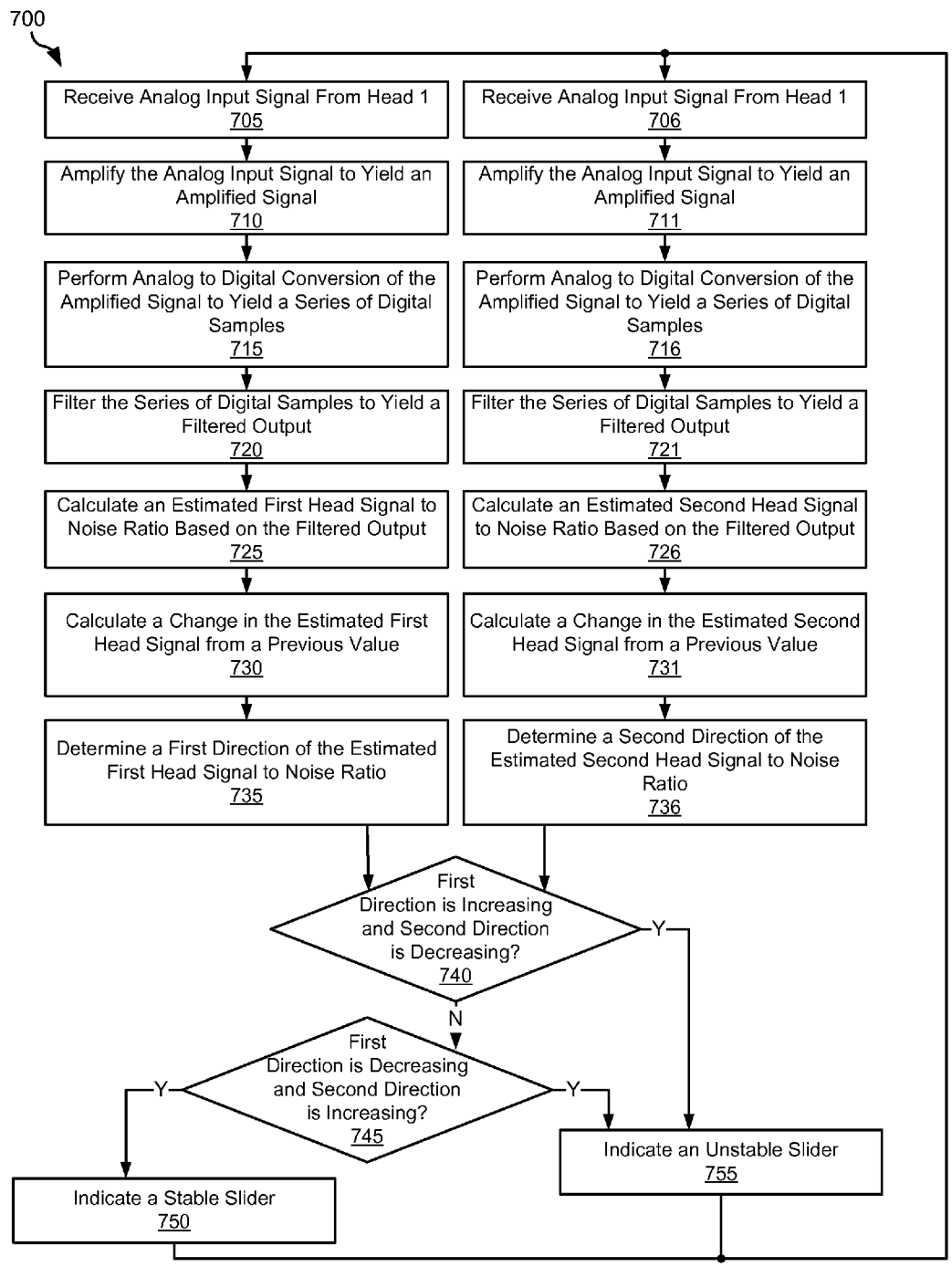
FIG. 7 is a flow diagram showing another method in accordance with various embodiments of the present invention for determining slider stability.

Turning to FIG. 7, a flow diagram 700 shows a method in accordance with various embodiments of the present invention for determining slider stability. Following flow diagram 700, an analog input signal is received from a first sensor (e.g., read sensor 215 of FIG. 2) (block 705). The analog input is amplified to yield an amplified signal (block 710). An analog to digital conversion is applied to the amplified signal to yield a series of digital samples (block 715). The series of digital samples are then filtered to yield a filtered output (block 720). An estimate of the signal to noise ratio of data derived from the first sensor is then calculated to yield a first sensor signal to noise ratio (block 725). A change in the estimated first head signal to noise ratio is calculated (block 730), and a first direction of the estimated signal to noise ratio is determined based upon the aforementioned change (block 735).

In parallel, an analog input signal is received from a first sensor (e.g., read sensor 220 of FIG. 2) (block 706). The analog input is amplified to yield an amplified signal (block 711). An analog to digital conversion is applied to the amplified signal to yield a series of digital samples (block 716), and the series of digital samples are then filtered to yield a filtered output (block 721). An estimate of the signal to noise ratio of data derived from the second sensor is then calculated to yield a first sensor signal to noise ratio (block 726). A change in the estimated second head signal to noise ratio is calculated (block 731), and a second direction of the estimated signal to noise ratio is determined based upon the aforementioned change (block 736).

It is determined whether the first direction is increasing and the second direction is decreasing (block 740). Where it is determined that the first direction is increasing and the second direction is decreasing (block 740), an unstable slider is indicated (block 755). Otherwise, it is determined whether the first direction is decreasing and the second direction is increasing (block 745). Where it is determined that the first direction is decreasing and the second direction is increasing (block 745), an unstable slider is indicated (block 755). Otherwise, a stable slider is indicated (block 750).

It should be noted that the various blocks discussed in the above application may be implemented in integrated circuits along with other functionality. Such integrated circuits may include all of the functions of a given block, system or circuit, or a subset of the block, system or circuit. Further, elements of the blocks, systems or circuits may be implemented across multiple integrated circuits. Such integrated circuits may be any type of integrated circuit known in the art including, but are not limited to, a monolithic integrated circuit, a flip chip integrated circuit, a multichip module integrated circuit, and/ or a mixed signal integrated circuit. It should also be noted that various functions of the blocks, systems or circuits discussed herein may be implemented in either software or firmware. In some such cases, the entire system, block or circuit may be implemented using its software or firmware equivalent. In other cases, the one part of a given system, block or circuit may be implemented in software or firmware, while other parts are implemented in hardware.

In conclusion, the invention provides novel systems, devices, methods and arrangements for stability determination. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims

What is claimed is:

1. A slider stability determination circuit, the slider stability determination circuit comprising:
    a first signal to noise estimation circuit operable to calculate a first signal to noise ratio associated with a first read sensor;
    a second signal to noise estimation circuit operable to calculate a second signal to noise ratio associated with a second read sensor;
    a summation circuit operable to subtract the first signal to noise ratio from the second signal to noise ratio to yield a delta signal to noise ratio; and
    a stability determination circuit operable to determine a slider stability based at least in part on the delta signal to noise ratio.

2. The slider stability determination circuit of claim 1, wherein the stability determination circuit includes a comparator circuit operable to compare a magnitude of the delta signal to noise ratio with a threshold value to yield a slider stability output.

3. The slider stability determination circuit of claim 2, wherein the threshold value is a fixed value.

4. The slider stability determination circuit of claim 2, wherein the threshold value is a user programmable value.

5. The slider stability determination circuit of claim 2, wherein the slider stability output is asserted to indicate instability when the delta signal to noise ratio is greater than the threshold value.

6. The slider stability determination circuit of claim 2, wherein the slider stability output is asserted to indicate stability when the delta signal to noise ratio is less than the threshold value.

7. The slider stability determination circuit of claim 1, wherein the slider stability determination circuit is implemented as part of a storage device.

8. The slider stability determination circuit of claim 7, wherein the storage device includes a slider having at least the first read sensor and the second read sensor, and wherein the slider is disposed in relation to a storage medium.

9. The slider stability determination circuit of claim 8, wherein the storage medium includes a servo data region and a user data region, wherein the first signal to noise ratio associated with the first read sensor is calculated based upon data derived from the servo data region, and wherein the second signal to noise ratio associated with the second read sensor is calculated based upon data derived from the servo data region.

10. The slider stability determination circuit of claim 1, wherein the slider stability determination circuit further comprises:

a first analog to digital conversion circuit operable to convert a first analog input derived from the first read sensor to yield a first series of digital samples;

a second analog to digital conversion circuit operable to convert a second analog input derived from the second read sensor to yield a second series of digital samples; and wherein the first signal to noise ratio is calculated based upon the first series of digital samples, and the second signal to noise ratio is calculated based upon the second series of digital samples.

11. The slider stability determination circuit of claim 1, wherein the slider stability determination circuit further comprises:

a first analog to digital conversion circuit operable to convert a first analog input derived from the first read sensor to yield a first series of digital samples;

a first filter circuit operable to filter the first series of digital samples to yield a first filtered output;

a second analog to digital conversion circuit operable to convert a second analog input derived from the second read sensor to yield a second series of digital samples;

a second filter circuit operable to filter the second series of digital samples to yield a second filtered output; and wherein the first signal to noise ratio is calculated based upon the first filtered output, and the second signal to noise ratio is calculated based upon the second filtered output.

12. A method for determining slider status in a storage device, the method comprising:

providing a slider including a first read sensor and a second read sensor;

receiving a first sensed data set from the first read sensor and a second sensed data set from the second read sensor;

estimating a first signal to noise ratio corresponding to the first sensed data set;

estimating a second signal to noise ratio corresponding to the second sensed data set; and determining a stability status of the slider based at least in part on the first signal to noise ratio and the second signal to noise ratio.

13. The method of claim 12, the method further comprising:

subtracting the first signal to noise ratio from the second signal to noise ratio to yield a delta signal to noise ratio; and wherein the stability determination circuit is operable to determine the slider stability based at least in part on the delta signal to noise ratio.

14. The method of claim 13, wherein determining the stability status includes:

comparing a magnitude of the delta signal to noise ratio with a threshold value to yield a slider stability output.

15. A storage device, the storage device comprising:

a storage medium;

a slider disposed in relation to the storage medium, wherein the slider includes a first read sensor and a second read sensor;

a slider stability determination circuit including:

a first signal to noise estimation circuit operable to calculate a first signal to noise ratio based upon data derived from the first read sensor;

a second signal to noise estimation circuit operable to calculate a second signal to noise ratio based upon data derived from the second read sensor; and a stability determination circuit operable to determine a stability status of the slider based at least in part on the first signal to noise ratio and the second signal to noise ratio.

16. The storage device of claim 15, wherein the slider stability determination circuit further comprises:

a summation circuit operable to subtract the first signal to noise ratio from the second signal to noise ratio to yield a delta signal to noise ratio; and wherein the stability determination circuit is operable to determine the slider stability based at least in part on the delta signal to noise ratio.

17. The storage device of claim 16, wherein the stability determination circuit includes a comparator circuit operable to compare a magnitude of the delta signal to noise ratio with a threshold value to yield a slider stability output.

18. The storage device of claim 17, wherein the slider stability output is asserted to indicate instability when the delta signal to noise ratio is less than the threshold value.

19. The storage device of claim 17, wherein the slider stability output is asserted to indicate stability when the delta signal to noise ratio is greater than the threshold value.

20. The storage device of claim 15, wherein the storage medium includes a servo data region and a user data region, wherein the first signal to noise ratio associated with the first read sensor is calculated based upon data derived from the servo data region, and wherein the second signal to noise ratio associated with the second read sensor is calculated based upon data derived from the servo data region.

* * * * *